Patented June 10, 1924.

1,497,088

UNITED STATES PATENT OFFICE

JOHN CAREY, OF WICHITA, KANSAS.

PROCESS OF SLIMING, FERMENTING, AND CLEANING OF SMALL INTESTINES OF SWINE.

No Drawing.    Application filed March 13, 1923.   Serial No. 624,865.

*To all whom it may concern:*

Be it known that I, JOHN CAREY, a citizen of the United States, residing at Wichita, in the county of Sedgwick and State of Kansas, have invented new and useful Improvements in Processes of Sliming, Fermenting, and Cleaning of Small Intestines of Swine, of which the following is a specification.

Said intestines, hereinafter called casings, after the same shall have been taken from the newly slaughtered swine, shall be stripped into tierces or tubs containing cold saline solution composed of one-half pound of salt to each gallon of water and remain therein for about sixteen hours. All water being removed from said tierces or tubs, the casings should then be allowed again to stand for not less than twelve hours, nor more than twenty-four hours, in a room the temperature of which is 80 degrees F. or not to exceed 90 degrees F., during which time said casings go through a sweat and fermenting process which causes slime therein to become soft and shrink said casings. At the end of the second period above referred to, said casings should show a temperature of 80 degrees F. or not to exceed 90 degrees F.

At the end of the second period above referred to, said casings should be placed in warm water for about ten minutes and then stripped into stripping tub filled with saline solution composed of one-half pound of salt to each gallon of water at a temperature of about 120 degrees F., said tub to be placed immediately back of casing machine.

After another ten minutes in the stripping tub, the casings are to be stripped again and allowed to stand for another ten minutes; they are then to be stripped again and placed in casing machine and cleaned. Not to exceed six pieces of casings are to be fed to machine at once as to do so will cause machine to cut the said casings. However said machine may be full of casings during all the time of run. After casings shall have passed through said machine, they are to be placed in cold water saline solution of one-half pound of salt to each gallon of water; casings are then to be graded for size and holes.

After grading is completed casings should stand for a short time in saline solution of one-half pound of salt to each gallon of water. Casings then to be salted and the blood therein allowed to pass from said casings. Thereupon casings become clean and white and should be taken from said salting after a period of not to exceed fifteen minutes. They are then bunched and salted and by the sixth day thereafter are ready to pack in tierces for the trade.

I claim:

The process of fermenting, sliming and cleaning of small intestines or casings, which consists in removing the contents of the casings by stripping, cooling the casings with water to remove all animal heat, soaking in water in a room at a temperature of 80 to 90 degrees F., again stripping to remove loosened slime, allowing casings to sweat in a room at a temperature of 80 to 90 degrees F., without water, stripping again to remove loosened slime, placing casings for not less than ten minutes in a concentrated saline solution at a temperature of 115 to 120 degrees F. and then giving the casings a final stripping.

JOHN CAREY.